United States Patent [19]

Kelley

[11] Patent Number: 4,742,105
[45] Date of Patent: May 3, 1988

[54] BINARY DEFLOCCULATING COMPOSITIONS

[75] Inventor: Edwin L. Kelley, Succasunna, N.J.

[73] Assignee: Diamond Shamrock Chemicals Company, Dallas, Tex.

[21] Appl. No.: 868,149

[22] Filed: May 29, 1986

[51] Int. Cl.$^4$ ............................................... C08K 3/34
[52] U.S. Cl. ................................................... 524/447
[58] Field of Search ......................................... 524/447

[56] References Cited

U.S. PATENT DOCUMENTS

| 4,106,949 | 8/1978 | Malden | 106/308 N |
| 4,175,975 | 11/1979 | MacWilliams et al. | 106/100 |
| 4,182,785 | 1/1980 | Price | 106/308 B |
| 4,309,222 | 1/1982 | Hoyt, 4th | 106/288 B |
| 4,376,178 | 3/1983 | Blount | 524/447 |

FOREIGN PATENT DOCUMENTS 47266 4/1980 Japan .

OTHER PUBLICATIONS

CA 88:25187w (1978).
CA 99:127212v (1983).
CA 102:226488b (1985).
The Chemistry and Physics of Clays (Fourth Edition), p. 526.
Encyclopedia of Chemical Technology, Kirk-Othmer, Third Edition, vol. 7, p. 839.
Kaolin Clays and Their Industrial Uses, J. M. Huber Corp. (1949), p. 27.

Primary Examiner—Joseph L. Schofer
Assistant Examiner—N. Sarofim
Attorney, Agent, or Firm—Ernest G. Szoke; Neal T. Levin

[57] ABSTRACT

Binary mixtures of polyacrylates and sodium silicates are used as deflocculating agents for kaolin slurries to ensure pumpability and pourability of the slurry. An example of a binary mixture is a mixture of 67% by weight sodium polyacrylate having a weight average molecular weight of 4,200 and 33% by weight of sodium silicate on a dry solids basis.

9 Claims, No Drawings

BINARY DEFLOCCULATING COMPOSITIONS

BACKGROUND OF THE INVENTION

1. Field of the Invention

This invention relates to binary deflocculating mixtures useful in reducing viscosity of kaolin slurries.

2. Description of the Prior Art

Kaolin, a clay which is essentially a hydrated aluminum silicate, is a well known article of commerce having varied uses. For example, kaolin is used as a filler in the body of paper and as a component of paper coatings. For such and other uses, kaolin is generally shipped as a 70% by weight aqueous slurry in tank cars and tank wagons. It is important to ensure that the slurry is a liquid, freely pumpable and pourable slurry so that it can be handled with no difficulty throughout slurry formation, shipping and use. One problem which arises when kaolin slurries are shipped in this manner, especially during summer months, is that slurry temperatures rise considerably thus increasing viscosity to undesirable levels which interfere with handling. In attempts to control viscosity, dispersants or deflocculating agents have been employed such as sodium polyacrylate, sodium metasilicate, tetrasodium pyrophosphate and other complex polyphosphates. Sodium polyacrylate is the deflocculant of choice; however, it is the most expensive. The silicates, although less expensive than sodium polyacrylate are less effective on a weight basis. With respect to both, kaolin slurry viscosities tend to rise over a period of time, especially in the presence of elevated temperatures.

SUMMARY OF THE INVENTION

Binary mixtures of soidum polyacrylate and sodium silicates have been found to be excellent deflocculating agents or dispersants for aqueous kaolin slurries. Kaoline slurries containing these mixtures are characterized by their pumpability and pourability as well as their ability to withstand viscosity increase during transportation and storage at elevated temperatures. Further, although silicates generally are less effective than polyacrylates on a weight basis, it has been found that binary mixtures which contain both polyacrylates and silicates as described herein are superior to the use of polyacrylates or silicates alone. That is, synergy with respect to (1) viscosity control and (2) viscosity stability with time at ambient and elevated temperatures have been achieved.

DESCRIPTION OF THE PREFERRED EMBODIMENTS

Binary mixtures containing sodium polyacrylate plus one or more sodium silicates are present in kaolin slurries in amounts sufficient to ensure pumpability and pourability of the slurry and to withstand viscosity increases at elevated temperatures (e.g., 120 deg. F.). Generally, from about 0.40% by weight to about 1.00% by weight of the binary mixture on a dry solids basis based on the weight of the kaolin in the slurry can be used. Preferably, about 0.5% by weight of the binary mixture on a dry solids basis is used based upon the weight of the kaolin in the slurry. The relative amounts of the two components in the binary mixture with respect to each other are from greater than about 50% by weight to about 80% by weight of sodium polyacrylate and from less than about 50% by weight to about 20% by weight of silicate, on a dry solids basis. The slurries contain from about 50% by weight to about 75% by weight, preferably about 70% by weight solids, the remainder being water.

The binary mixture or deflocculant can be introduced into the slurry as such or each of its components can be introduced separately. This is followed by mixing. The binary mixture itself can be prepared by simple mixing of its components. The components can be in the form of solids or aqueous solutions so that the mixture can be a solid or an aqueous solution. When in solution form, generally there can be from about 30% by weight to about 50% by weight of solids and from about 70% by weight to about 50% by weight of water. Aqueous solutions of these mixtures upon standing do not separate.

The polyacrylate is generally sodium polyacrylate although other salts such as the ammonium and potassium salts may be used. The polyacrylate is essentially neutralized and has a weight average molecular weight of from about 2,000 to about 10,000. These polyacrylates are well known articles of commerce and their preparation from acrylic acid is likewise well known.

Regarding sodium silicates, also known as soluble silicates, they are a family of chemicals composed of different proportions of sodium oxide ($Na_2O$), silica ($SiO_2$) and usually but not always water ($H_2O$). Examples of commercial sodium silicates are $Na_2O:2SiO_2$, sodium orthosilicate ($2SiO_2:SiO$) and sodium metasilicate. The sodium silicates are supplied in both liquid, i.e., aqueous solutions and solid form. Useful commercial products are set forth below.

Grade designations are taken from literature of Diamond Shamrock Chemicals Company.

| GRADE 50 | |
| --- | --- |
| Specific Gravity at 20 deg. C. | 1.526 (50.0 deg. Baume) |
| Viscosity at 20 deg. C. | 335 Centipoises |
| Weight Ratio | $Na_2O:2.00\ SiO_2$ |
| Weight Per Gallon | 12.71 Pounds |
| Solids Content | 44.1% |
| GRADE 52 | |
| Specific Gravity at 20 deg. C. | 1.559 (52.0 deg. Baume) |
| Viscosity at 20 deg. C. | 1760 Centipoises |
| Weight Ratio | $Na_2O:2.40\ SiO_2$ |
| Weight Per Gallon | 12.98 Pounds |
| Solids Content | 47.3% |
| GRADE 42 | |
| Specific Gravity at 20 deg. C. | 1.408 (42.0 deg. Baume) |
| Viscosity at 20 deg. C. | 63 Centipoises |
| Weight Ratio | $Na_2O:2.54\ SiO_2$ |
| Weight Per Gallon | 11.73 Pounds |
| Solids Content | 37.5% |

EVALUATION OF THE BINARY MIXTURES IN KAOLIN SLURRIES

The efficacy of the deflocculants is determined by conducting heat aging tests of kaolin slurries containing same and observing viscosity changes of the slurry. The following procedure was used.

Apparatus

Electrically heated convection oven
8 oz. glass jars, capped
Brookfield viscometer, Model LVT

Reagents

Ultrawhite 90 (Georgia Kaolin Co.) clay slurry (58% by wt. clay, 42% by wt. water), no dispersant present Sodium polyacrylate/sodium silicate aqueous solution (1:0.5 wt. ratio of solids), 40% by wt. total solids in the solution

Procedure

A. Preparation of deflocculating agent

Aqueous solutions of sodium polyacrylate having a weight average molecular weight of 4,200 and sodium silicate shown below were mixed together with additional water to form the following composition.

| | |
|---|---|
| Sodium polyacrylate solution (43.0% by wt. solids) | 62.0% |
| Sodium silicate solution Grade 50 (44.1% by wt. solids) | 30.2% |
| Water | 7.8% |
| | 100.0% |

The weight ratio of sodium polyacrylate/sodium silicate is 1:0.50.

B. Preparation of slurry

Ultrawhite 90 kaolin clay slurry (58% by wt. solids) obtained from Georgia Kaolin Co. and the deflocculant solution from Part A were stirred together using a mechanical mixer.

C. Test method

1. Slurry viscosity determination

To different 340 gram portions of the kaolin slurry prepared according to Part B above were added small, weighed increments of deflocculating agent, each increment followed by mechanical mixing and a viscosity determination using a Brookfield Model LVT viscometer. Increments were added past the point where viscosity begins to increase.

2. Heat Aging Test

Initial slurry viscosities are determined. Samples are then placed in capped jars and put into an oven at 120 deg. F. for fourteen days. At end of this time, slurry viscosities are again determined.

For a fuller understanding of the nature and advantages of this invention, reference may be made to the following examples. These examples are given merely to illustrate the invention and are not to be construed in a limiting sense. All quantities, proportions and percentages are by weight and all weights of the deflocculant and kaolin are of solids.

The characteristics of the binary mixtures as well as their ability to function as deflocculating or dispersing agents for kaolin slurries are illustrated in Table I below. The binary mixtures and slurries containing same were prepared and viscosities measured at room temperature in accordance with the preparation and test procedure given above.

TABLE I

Kaolin Slurry Viscosities at Room Temperature

| % of Dispersant Solids Based on Kaolin Solids | Na Polyacrylate[1] soln. - 43.0% by wt. solids (cps) | Na Silicate[2] Soln. 44.1% by wt. solids (cps) | Na Polyacryate[1]/ Na Silicate Soln. (2:1 wt. ratio) 40% by wt. solids (cps) |
|---|---|---|---|
| 0.40 | 500 | 2750 | 60 |
| 0.45 | 58 | 700 | 31 |
| 0.50 | 30 | 155 | 20 |
| 0.55 | 36 | 40 | 30 |
| 0.60 | 48 | 32 | 46 |
| 0.65 | 62 | 36 | 58 |
| 0.70 | 80 | 44 | 78 |

[1]Mol. wt. = 4,200
[2]Grade No. 50

As the data in Table I indicate, use of the binary mixtures to reduce viscosity of kaolin slurries is in most instances far superior to the use of each component alone.

The following Table II demonstrates a major advantage resulting from use of the present invention, viz., the efficacy of the binary compositions over a period of time and at elevated temperatures.

TABLE II

VISCOSITY STABILITY OF 58% BY WEIGHT SOLIDS KAOLIN SLURRIES (OVEN TEMPERATURE = 120° F.)

| Dispersant | % Dispersant Solids on Clay Solids | % Solids in Dispersant Soln. | Brookfield Visc. Before Aging (cps) | Brookfield Visc. After 14 Days Aging at 120° F. (cps) | Slurry Visc. Change |
|---|---|---|---|---|---|
| Na polyacrylate[1] | 0.50 | 43.0 | 50 | 60 | Increase |
| Colloid 211[2] (Na polyacrylate) | 0.50 | 43.0 | 50 | 80 | Increase |
| Sodium silicate No. 52 | 0.50 | 47.3 | 45 | 65 | Increase |
| Sodium silicate No. 50 | 0.50 | 44.1 | 45 | 170 | Increase |
| Na polyacrylate[1]/ sodium silicate[3] mixture 1:0.50 wt. ratio | 0.50 | 40.0 | 45 | 40 | Decrease |

[1]Mol. wt. 4200
[2]Mol wt. 3180
[3]Grade No. 50

The above data demonstrate that the binary mixtures of this invention, in contrast to each component alone, result in viscosity stability of the kaolin slurry over a period of time and at elevated temperatures.

While the invention has been described with reference to certain specific embodiments thereof, it is understood that it is not to be so limited since alterations and changes may be made therein which are within the full intended scope of the appended claims.

What is claimed is:

1. Binary mixture of (1) at least one of sodium, potassium and ammonium polyacrylate having a weight average molecular weight of between about 2,000 to about 10,000 and (2) sodium silicate, said polyacrylate and sodium silicate being present in amounts of from greater than about 50% by weight to about 80% by weight of polyacrylate and from less than about 50% by weight to about 20% by weight of sodium silicate on a dry solids basis, said binary mixture being useful as deflocculating agent for aqueous kaolin slurries.

2. The binary mixture of claim 1 wherein there is present about 67% by weight of sodium polyacrylate having a weight average molecular weight of about 4,200 and about 33% of sodium silicate of the structure Na$_2$O:2SiO$_2$.

3. An aqueous solution of the binary mixture of claim 1 wherein there is present from about 30% by weight to about 50% by weight of solids and about 70% by weight to about 50% by weight of water.

4. The aqueous solution of claim 3 wherein there is present sodium polyacrylate having a weight average molecular weight of about 4,200 and sodium silicate of the formula Na$_2$O:2.00SiO$_2$.

5. The aqueous solution of claim 4 wherein there is present about 27% by weight of sodium polyacrylate, about 13% by weight sodium silicate and about 60% by weight water.

6. An aqueous kaolin slurry containing binary mixture of (1) at least one of sodium, potassium and ammonium polyacrylate having a weight average molecular weight of between about 2,000 to about 10,000 and (2) sodium silicate, said binary mixture containing from greater than about 50% by weight to about 80% by weight of polyacrylate and from less than about 50% by weight to about 20% by weight of sodium silicate on a dry solids basis, said binary mixture being present in amounts sufficient to ensure pumpability and pourability of the slurry and to withstand viscosity increase at elevated temperatures.

7. The slurry of claim 6 wherein said binary mixture is present in an amount of from about 0.40% by weight to about 1.00% by weight on a dry solids basis based on the weight of the kaolin in said slurry.

8. The slurry of claim 7 wherein said binary mixture is present in an amount of about 0.5% by weight on a dry solids basis based on the weight of the kaolin in said slurry.

9. The slurry of claim 8 wherein said binary mixture contains about 67% by weight of sodium polyacrylate having a weight average molecular weight of about 4,200 and about 33% of sodium silicate of the structure Na$_2$O:2SiO$_2$ on a dry solids basis.

* * * * *